United States Patent [19]

Sugiyama

[11] Patent Number: 4,512,311
[45] Date of Patent: Apr. 23, 1985

[54] INTAKE CONTROL SYSTEM FOR MULTI-VALVE TYPE INTERNAL COMBUSTION ENGINE

[75] Inventor: Keiichi Sugiyama, Shizuoka, Japan

[73] Assignee: Yamaha Hatsudoki Kabushiki Kaisha, Japan

[21] Appl. No.: 588,358

[22] Filed: Mar. 2, 1984

[30] Foreign Application Priority Data

Oct. 20, 1980 [JP] Japan .............................. 55-147150

Related U.S. Application Data

[63] Continuation of Ser. No. 312,673, Oct. 19, 1981, abandoned.

[51] Int. Cl.³ ............................................. F02D 9/08
[52] U.S. Cl. .................................... 123/432; 123/442
[58] Field of Search ................ 123/308, 337, 432, 442

[56] References Cited

U.S. PATENT DOCUMENTS

| | | | |
|---|---|---|---|
| 3,186,388 | 6/1965 | Bricout | 123/432 |
| 3,211,137 | 10/1965 | Love | 123/432 |
| 3,418,981 | 12/1968 | Von Seggern et al. | 123/432 |
| 3,620,195 | 11/1971 | Lamm | 123/337 |
| 3,964,451 | 6/1976 | Goto | 123/432 |
| 4,317,438 | 3/1982 | Yagi et al. | 123/308 |

Primary Examiner—Parshotam S. Lall
Assistant Examiner—W. R. Wolfe
Attorney, Agent, or Firm—Ernest A. Beutler

[57] ABSTRACT

Several embodiments of induction systems for internal combustion engines embodying pairs of intake passages each serving a single cylinder of the engine. In accordance with each embodiment of the invention, a device is provided for restricting the communication of the intake passages with the cylinder during idle operation so as to improve idle by precluding the backflow of exhaust gases into the intake passages. In some embodiments, the restricting means consists of throttle valves positioned in one or both of the intake passages and which are moved to a closed position when the engine is operating at idle. In accordance with embodiments of the invention, the cams associated with the intake valves provide for opening of one intake valve prior to opening of the other intake valve.

11 Claims, 6 Drawing Figures

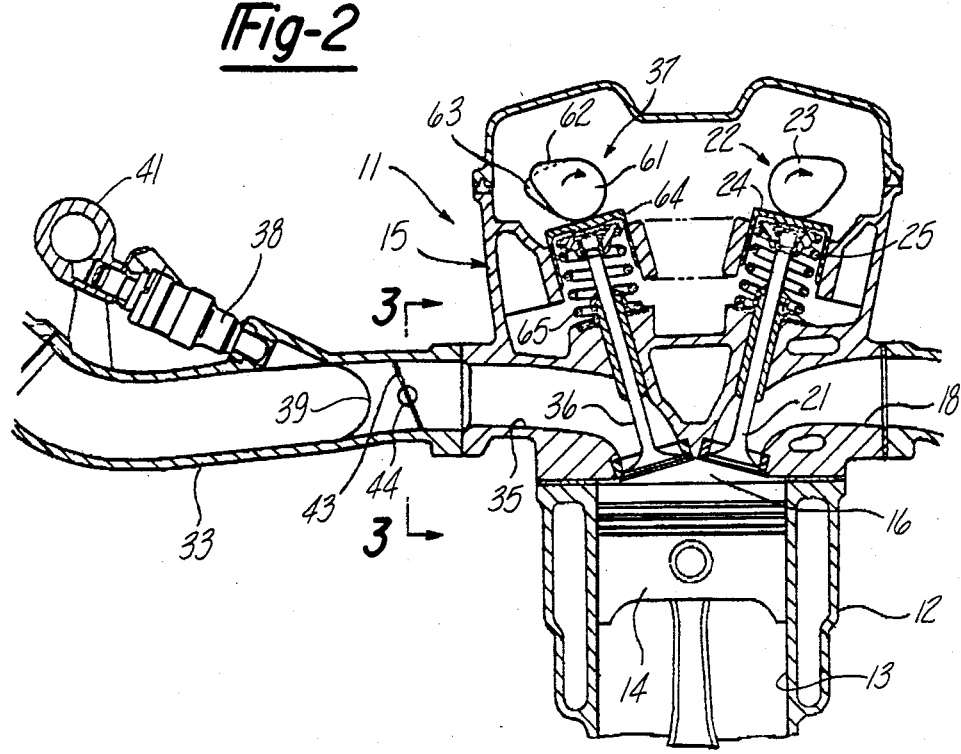

Fig-5
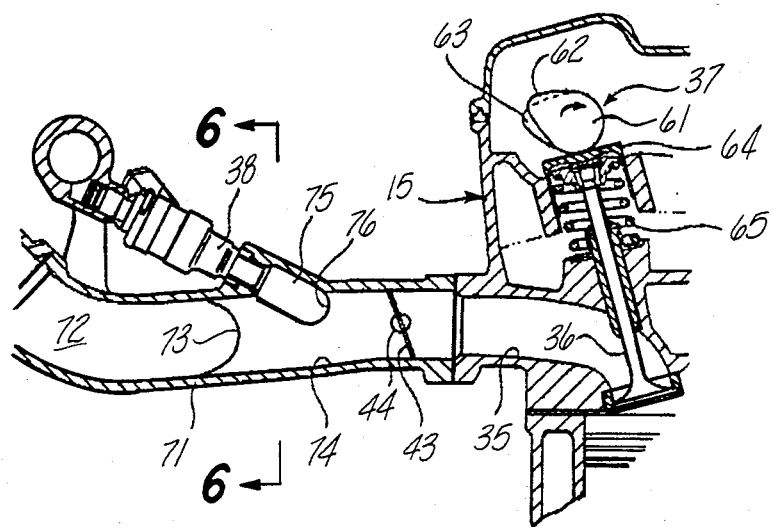
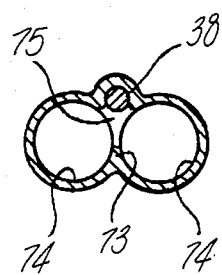
Fig-6

INTAKE CONTROL SYSTEM FOR MULTI-VALVE TYPE INTERNAL COMBUSTION ENGINE

This application is a continuation of application Ser. No. 312,673, filed Oct. 19, 1981, now abandoned.

BACKGROUND OF THE INVENTION

This invention relates to an intake control system for internal combustion engines and more particularly to an improved induction system for a high performance engine.

As is well known, the valve timing of an internal combustion engine is generally a compromise between achieving maximum power output and smooth running at low engine speeds. Although relatively large valve overlaps (intake and exhaust valves both open at the same time) permit good volumetric efficiency at high engine speeds and maximum power output, idling performance is significantly deteriorated. The reasons engines having high degrees of valve overlap idle poorly is that the exhaust gases tend to flow back into the intake system at low speeds and when both the intake and exhaust valves are open at the same time. As a result, the engines idle poorly. With the so called "sporty type" cars embodying large valve overlaps it has been proposed to employ high idle speeds so as to avoid the rough running which would occur at lower idle speeds. Such high idle speeds, however, result in poor fuel economy and unnecessary noise.

It is, therefore, a principal object of this invention to provide an improved intake control system for an internal combustion engine which permits high power outputs but also offers improved idle operation.

It is another object of this invention to provide an improved system for an engine having a large degree of valve overlap which significantly improves idle operation.

In addition to providing high degrees of valve overlap to improve maximum power output from an engine, it has been proposed to provide multiple valves for each cylinder. The use of two intake ports and valves and two exhaust ports and valves for an engine has also been proposed as a way of increasing maximum power output. When such multiple intake passage engines are employed they exhibit similar running characteristics to engines having high degrees of valve overlap. Even if extreme valve timing is not employed, the use of multiple valves provides a large intake area when the exhaust valves are still open which give rise to the backflow of exhaust gases that deteriorates idle performance.

It is, therefore, a still further object of this invention to provide an improved intake system for an engine having multiple intake passages serving a single chamber.

SUMMARY OF THE INVENTION

A first feature of this invention is adapted to be embodied in an induction system for a chamber of an internal combustion engine having inlet means communicating with the chamber, exhaust means communicating with the chamber and means for controlling the communication of the inlet and exhaust means with the chamber and providing for opening of the inlet means prior to full closure of the exhaust means. In accordance with this feature of the invention, means are provided for limiting the effective area of the inlet means during idle and minimizing the backflow of exhaust products into the inlet means when both the inlet means and exhaust means are open.

Another feature of this invention is adapted to be embodied in an induction system for a chamber of an internal combustion engine having first and second inlet passages each communicating with the chamber for delivering the charge thereto and exhaust means communicating with the chamber for receiving a burnt charge therefrom. Means are provided for controlling the communication of each of the inlet means and of the exhaust means with the chamber. In accordance with this feature of the invention, means are provided for opening one of the inlet means prior to opening of the other of the inlet means.

BRIEF DESCRIPTION OF THE DRAWINGS

FIG. 2 is a cross-sectional view taken through a single cylinder of the engine shown in FIG. 1.

FIG. 3 is a cross-sectional view taken along the line 3—3 of FIG. 2.

FIG. 5 is a cross-sectional view, in part similar to FIG. 2, showing a still further embodiment of the invention.

FIG. 6 is a cross-sectional view taken along the line 6—6 of FIG. 5.

DETAILED DESCRIPTION OF THE PREFERRED EMODIMENTS

Figure 1:
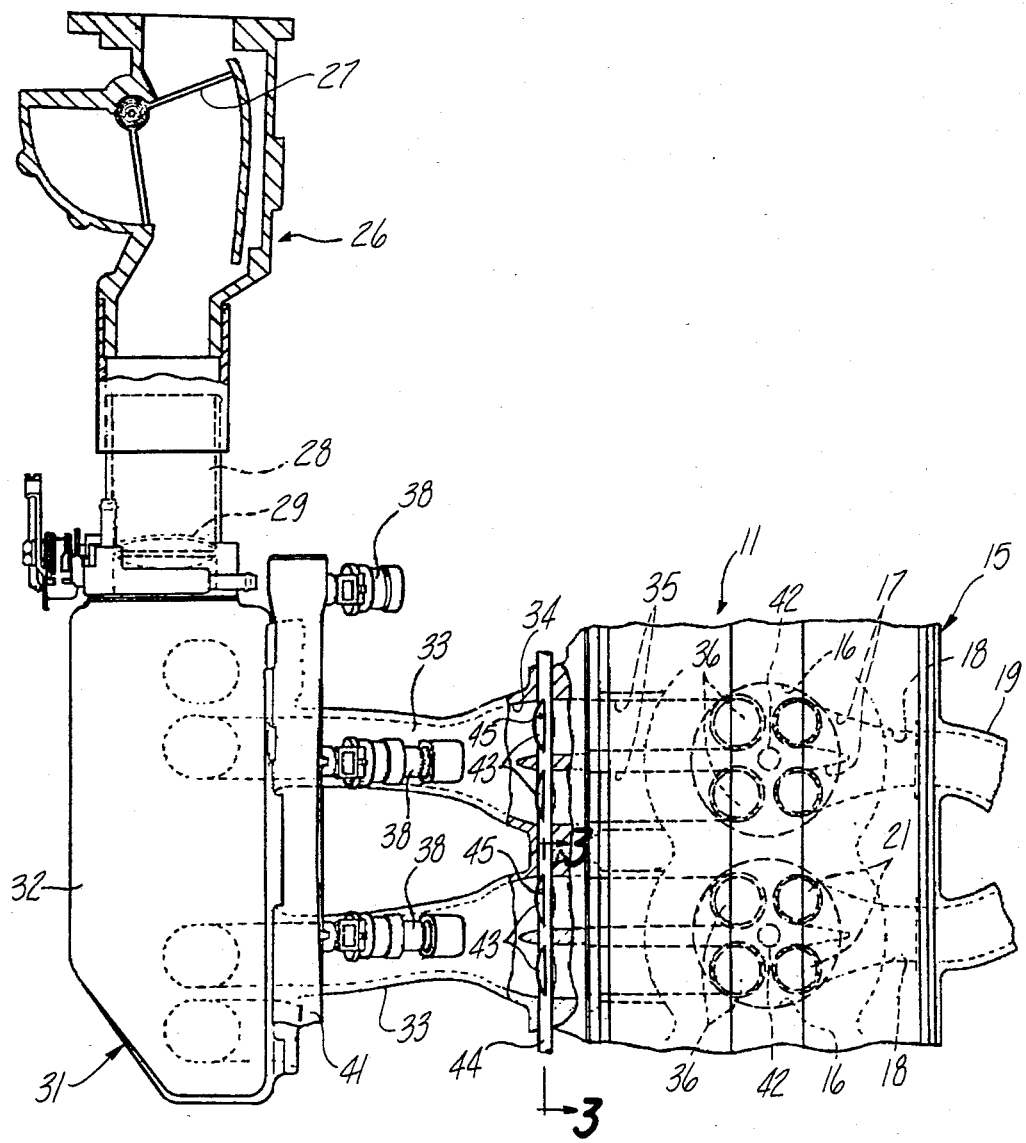
FIG. 1 is a top plan view of a portion of an internal combustion engine constructed in accordance with a first embodiment of this invention, with portions broken away.

In FIGS. 1 through 3 a four cylinder inline reciprocating engine constructed in accordance with a first embodiment of the invention is identified generally by the reference numeral 11. Although the invention is described in conjunction with an engine of this type, it is to be understood that certain facets may be employed in conjunction with engines of other cylinder numbers and configurations or with engines of the rotary type.

The engine 11 includes a cylinder block 12 in which cylinder bores 13 are formed. Pistons 14 reciprocate in the cylinder bores 13 and drive a crankshaft (not shown) in a known manner. A cylinder head, indicated generally by the reference numeral 15, is affixed to the cylinder block 12 and has cavities 16 that cooperate with the pistons 14 and cylinder bores 13 to provide chambers of volume which vary as the pistons 14 reciprocate. The cavities 16 will at times herein be referred to as the combustion chambers.

One side of the cylinder head 15 is formed with pairs of exhaust ports 17 that merge into a common exhaust passage 18 from which exhaust gases are delivered to a manifold 19. Exhaust valves 21 are provided in each of the exhaust ports 17 for controlling the communication of the exhaust ports 17 with the combustion chamber 16. The exhaust valves 21 are operated by means of an exhaust valve operating mechanism, indicated generally by the reference numeral 22, and including an exhaust camshaft 23 that operates cup 24 associated with each of the valves 21 for operating the valves 21 in a known manner. Exhaust valve springs 25 urge the cups 24 into engagement with the exhaust camshaft 23 and also urge the exhaust valves 21 to their closed position.

The engine 11 also includes an induction system comprised of a main intake 26 in which an airflow detector 27 of a known type is provided. The intake 26 supplies intake air drawn from an air cleaner (not shown) into a throttle body 28 in which a manually operated throttle valve 29 is positioned. The throttle body 28 in turn communicates with an intake manifold, indicated generally by the reference numeral 31 and specifically with a plenum chamber 32 thereof. From the plenum chamber 32, the intake manifold 31 has a plurality of individual runners 33 that extend to respective of the combustion chambers 16. Each runner 33 is divided at its outlet end into a pair of branch passages 34. The manifold branch passages 34 each serve a pair of cylinder head intake passages 35 that terminate in intake ports that communicate with the respective combustion chamber 16. An intake valve 36 is provided for each cylinder head intake passage 35 and is operated by means of an overhead mounted intake cam, indicated generally by the reference numeral 37, in a manner to be described.

A fuel injection nozzle 38 is provided in each manifold runner 33 and is disposed so as to discharge at a wall 39 from which the manifold passages 38 branch. In this way, it is ensured that an equal amount of fuel will be delivered to each manifold branch 34 and cylinder head intake passage 35. Fuel is supplied to the nozzles 38 via a fuel manifold 41 from a suitable pump that is controlled in a known manner so as to provide a metered amount of fuel that is dependent upon the air flow as sensed by the meter 27.

A spark plug 42 is provided in each combustion chamber 16 for firing the charge therein. The spark plugs 42 are operated in a known manner by means of any of the known systems provided for this purpose.

The engine 11 as thus far described may be considered to be conventional. With this type of engine the use of the multiple intake valves 36 causes a fairly large degree of intake valve opening, even if relatively modest valve overlaps are employed, during such time as the intake valves 36 and exhaust valves 21 are both open. This is a result of the large area provided by the use of the dual intake valves 36. When the engine 11 is operating at idle under these conditions, there is a tendency for exhaust gases to backflow from the combustion chamber 16 into the cylinder head intake passages 35 so as to cause rough running at idle. An arrangement, however, to be described is provided for limiting the effective area of the intake passages during idling and thus avoiding the backflow of exhaust gases.

In accordance with this invention, pairs of throttle valves 43 are provided in the manifold branch passages 34 immediately downstream of the wall 39. The pairs of throttle valves 43 associated with each combustion chamber 16 are all affixed to a common throttle valve shaft 44. The throttle valve shaft 44 is operated by means of a suitable linkage system (not shown) in conjunction with the main throttle valve 29 so that the throttle valves 43 are substantially in a closed position when the main throttle valve 29 is in its closed or idle position. The linkage affects opening of the throttle valves 43 after the main throttle valve 29 is moved from its idle position and the arrangement may be such that the throttle valves 43 are in their fully opened position prior to full opening of the main throttle valve 29. In accordance with this embodiment of the invention, one throttle valve 43 associated with each combustion chamber 16 is formed with a relatively small hole 45 therein (FIG. 3). During idling operation when the throttle valves 43 are in their closed position, the idle airflow will pass through the opening 45 and be inducted into the combustion chamber 16 at a high velocity. Thus, the restriction to flow provided by the closed throttle valves 43 prevents the backflow of exhaust gases. In addition, the use of the small hole 45 so as to provide the idle airflow causes the idle air to enter the chamber 16 at a high velocity which will ensure rapid flame propagation and good combustion. In this way, a smooth idle operation is provided as well as good fuel economy and effective exhaust gas emission control.

When the main throttle valve 29 is opened past its idle position, the throttle valve shaft 44 and throttle valves 43 will be opened through the aforedescribed linkage so as to remove the restriction to the intake passages afforded by the throttle valves 43 and permit good volumetric efficiency. The transition from idle to off idle operation is accomplished smoothly so as to provide good running under all conditions.

Figure 4:
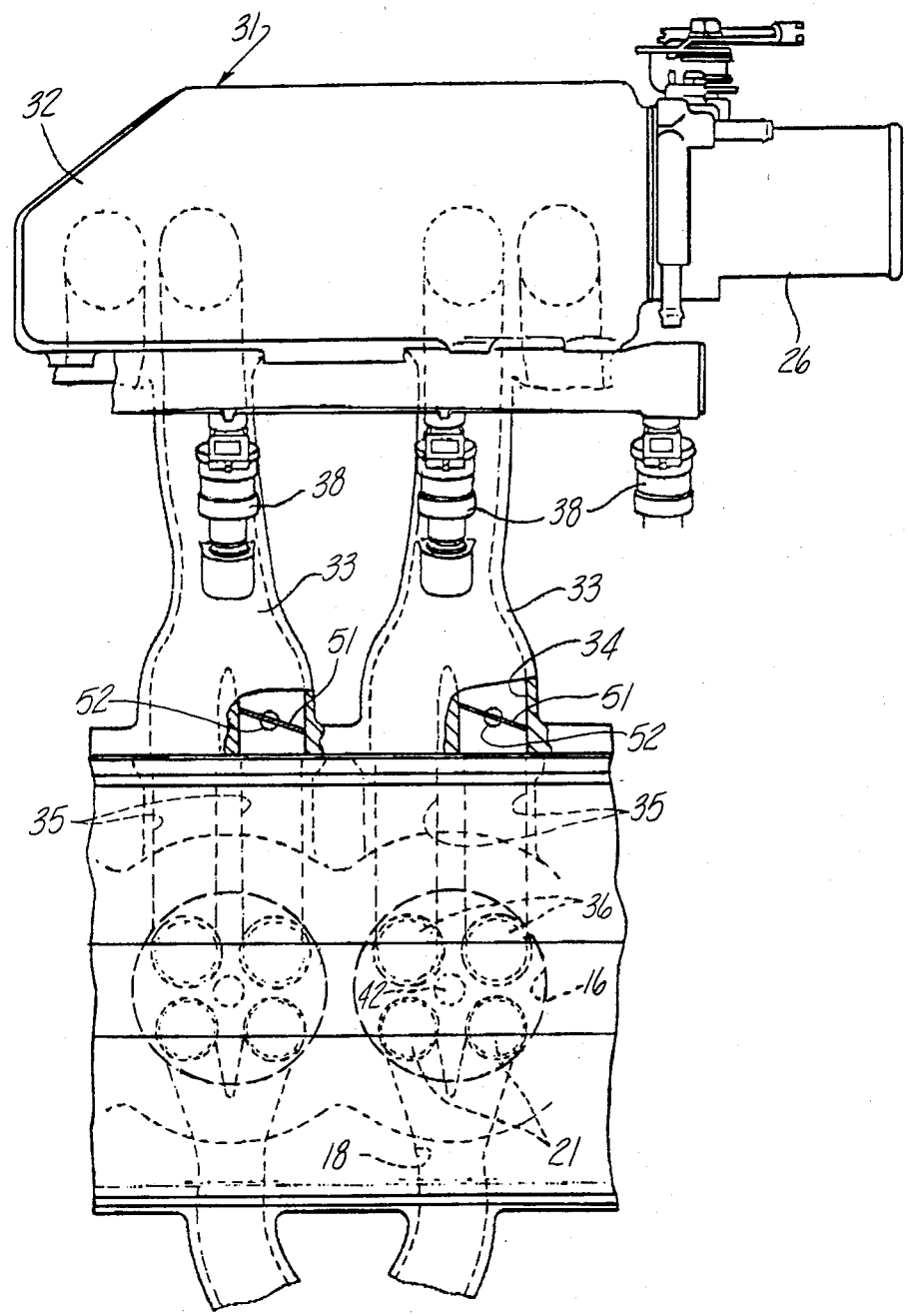
FIG. 4 is a top plan view, with portions broken away, in part similar to FIG. 1 and shows a further embodiment of the invention.

FIG. 4 illustrates an embodiment wherein a control valve 54 is provided in only one of the manifold branch passages 34 associated with each combustion chamber 16. Each control valve 51 is affixed to a control valve shaft 52 which, in this embodiment, is preferably disposed parallel to the axis of the cylinder bore 13. The control valves 51 are operated by means of an appropriate linkage system (not shown) that is coupled to the main throttle valve so that the control valves 51 will be closed when the engine is in its idling condition. Thus, the idle charge will be delivered to each combustion chamber 36 through only the unthrottled manifold branch passages 34 and cylinder head intake passage 35. Thus, a restriction to the flow is provided during idle and the amount of exhaust gas backflow during this running condition will be restricted. As the engine moves off idle, the control valves 51 will be opened through the linkage system and the charge will be delivered to the chamber 16 through both branch passages and cylinder head passages 34, 35. Maximum power output can, therefore, be achieved.

Aside from the use of the single control valve 51 for each cylinder, the construction of the embodiment of FIG. 4 is the same as the previously described embodiment. for that reason, common components have been identified by the same reference numerals and their description has not been repeated.

In the two embodiments described (that of FIGS. 1 through 3 and that of FIG. 4) the idle operation was accomplished by restricting the flow through at least one of the intake passages serving the respective combustion chamber. This is either done by control valves in both intake passages with a flow passage through one control valve as in the embodiment of FIGS. 1 through 3 or by providing a control valve in one of the intake passages as in the embodiment of FIG. 4. Further idling movement may be achieved by providing different timing of the intake valves 36 associated with each combustion chamber 16. This timing mechanism retards the opening of the intake valve 36 associated with the passages which supply the idle air relative to the other intake valve 36. This may be accomplished by the construction shown in FIG. 2 wherein an intake cam 61 has a first lobe 62 and a second lobe 63 which are displaced relative to each other in the direction of rotation of the camshaft 61 as indicated by the arrow in this figure. That is, the cam lobe 62 is advanced relative to the cam lobe 63 so that the valve opened by the cam lobe 62 will open before that associated with the cam lobe 63. In accordance with this embodiment, the cam lobe 63 operates the intake valve 36 that is associated either with the passage served by the throttle valve 43 that has the hole 45 or with the intake passage which lacks the control valve 51 as with the embodiment of FIG. 4. Thus, under idle operation there is less overlap between the intake valve 36 that admits the intake charge and backflow conditions are further reduced. However, maximum power output is not sacrificed since the remaining intake valve (that operated by the cam lobe 62) has more advance and provides additional overlap.

As with the operation of the exhaust valves 27, the cam lobes 62 and 63 act against cups 64 that operate the intake valves 36. Springs 65 act to return the cups 64 and valves 36 to the closed position.

It has been previously noted that it is desirable to position the fuel injection nozzles 38 upstream in the manifold runners 31 from the point where they branch to the individual intake passages so as to ensure good fuel distribution. In some instances, however, the manifold branches 33 may be so long as to make it undesirable to place the injection nozzles 38 at this location. FIGS. 5 and 6 illustrate an embodiment of the invention wherein this condition is illustrated and an arrangement for ensuring good fuel distribution is provided.

In this embodiment, those components which are the same as the previously described embodiments have been identified by the same reference numeral and the description of their operation will not be repeated. In connection with this embodiment, the intake manifold runners, indicated generally by the reference numeral 71, are relatively long. The runners 71 have a main passage 72 which branches at a wall 73 into the individual intake passages 74 in which the throttle valves 43 are provided. In accordance with this embodiment, the injection nozzle 38 is positioned downstream of the wall 73. The nozzle 38 is positioned so as to inject into a pocket 75 formed in the wall 73 between the manifold runners 74. The pocket 75 opens into each of the runners 74. Thus, fuel discharged from the nozzle 38 will impinge upon a wall 76 formed at the base of the pocket 75 and be disbursed evenly into the runners 74.

In conjunction with the embodiments described, it is not necessary that the throttle valves 43 or control valve 51 be accurately matched relative to the portion of the intake passage through which the flow is controlled. That is, it is not essential that the respective valve completely close this passage during idling operation.

It should be readily apparent that each of the described embodiments provides an arrangement wherein the backflow of exhaust gases into the intake system during idle is precluded by restricting the communication of the intake passages with the combustion chamber under this running condition. However, this restriction is removed immediately upon opening of the main throttle valve beyond its idle position so as to improve performance and particularly ensure that maximum power output may be obtained. However, this maximum power output is achieved without adversely affecting the idle operation of the engine. Also, it is not neccessary to unduly increase the engine idle speed. Although certain embodiments have been illustrated and described, it is to be understood that various changes and modifications may be made to the invention, without departing from the spirit and scope as defined by the appended claims.

I claim:

1. In an induction system for a chamber of an internal combustion engine having inlet means communicating with said chamber, for delivering a charge thereto, main throttle valve means in said inlet means for controlling the flow therethrough, exhaust means communicating with said chamber for receiving a burnt charge therefrom, means for controlling the communication of said inlet means and said exhaust means with said chamber for providing for opening of said inlet means prior to full closure of said exhaust means, the improvement comprising means for limiting the effective area of said inlet means during idle for minimizing the backflow of exhaust products into said inlet means when said inlet means and said exhaust means are both open and for reducing said restriction when said engine is in an off idle condition comprising a control valve means in said inlet means downstream of said main throttle valve means and means for commencing the opening of said control valve means immediately upon opening said main throttle valve past its idle condition, said means for opening said control valve means comprises linkage means interconnecting said control valve means with said main throttle valve and adapted to open said control valve means at a faster rate than said main throttle valve is opened so that said control valve means is in its fully open position prior to full opening of said main throttle valve.

2. In an induction system as set forth in claim 1 wherein the control valve means is operated in sequence with the main throttle valve means, said control valve means being in a closed position when said main throttle valve means is in an idle position and means for providing flow past said control valve means when in its closed position.

3. In an induction system as set forth in claim 2 wherein the means for providing the flow past the control valve means comprises an opening therein.

4. In an induction system as set forth in any of claims 1 or 3 wherein the intake means comprises an intake passage and an intake valve, the exhaust means comprising an exhaust passage and an exhaust valve and the means for controlling the communication comprising cam means for operating said intake valve and said exhaust valve.

5. In an induction system as set forth in claim 1 wherein the intake means comprises a pair of intake passages each serving the chamber.

6. In an induction system as set forth in claim 5 wherein the means for operating the intake means comprises means for opening one of the intake passages prior to opening of the other of the intake passges.

7. In an induction system as set forth in claim 5 wherein the means for limiting the effective area comprises means for restricting the flow through one of said intake passages more than the flow through the other of the intake passages serving the chamber.

8. In an induction system as set forth in claim 7 wherein the main throttle valve is positioned upstream of said intake passages for controlling the flow therethrough, the control throttle valve means being positioned in at least one of the intake passages downstream of the main throttle valve.

9. In an induction system as set forth in claim 8 wherein the control throttle valve means comprises a pair of throttle valves one positioned in each of the intake passages, on of said throttle valves providing less of a flow resistance in its closed position than the other of said throttle valves.

10. In an induction system as set forth in any of claims 5 through 9 wherein the intake means further comprises a pair of intake valves, each positioned in one of said intake passages, the exhaust means comprising an exhaust passage and an exhaust valve and the means for controlling the communication comprising cam means for operating said intake valves and said exhaust valve.

11. In an induction system as set forth in claim 10 wherein the means for operating the intake valves comprise a pair of cam lobes one associated with each of the intake valves, one of said cam lobes being adapted to provide a different advance than the other of said cam lobes.

* * * * *

UNITED STATES PATENT AND TRADEMARK OFFICE
CERTIFICATE OF CORRECTION

PATENT NO. : 4,512,311
DATED : April 23, 1985
INVENTOR(S) : Keiichi Sugiyama

It is certified that error appears in the above-identified patent and that said Letters Patent is hereby corrected as shown below:

Column 2, line 64, "cup" should be --cups--.

Column 4, line 44, "for" should be --For--.

Column 4, line 56, "movement" should be --improvement--.

Column 6, line 39, Claim 4, line 2, "1 or 3" should be --1, 2 or 3--.

Column 6, line 51, Claim 6, line 4, "passges" should be --passages--.

Column 6, line 66, Claim 9, line 4, "on" should be --one--.

Signed and Sealed this

Twenty-sixth Day of November 1985

[SEAL]

Attest:

DONALD J. QUIGG

Attesting Officer

Commissioner of Patents and Trademarks